United States Patent [19]

Schnepp

[11] Patent Number: 4,832,296
[45] Date of Patent: May 23, 1989

[54] GIANT TRIPOD ASSEMBLY FOR SUPPORTING AND CONTROLLING LONG-RANGE LASER BEAM GENERATORS

[76] Inventor: Monte J. Schnepp, P.O. Box 208, Sandy, Oreg. 97055

[21] Appl. No.: 180,193

[22] Filed: Apr. 11, 1988

[51] Int. Cl.⁴ ............................................. F16M 11/38
[52] U.S. Cl. .................................. 248/168; 248/188.5; 248/508
[58] Field of Search ................... 248/168, 163.1, 163.2, 248/166, 167, 169, 170, 171, 188.5, 188.4, 508; 354/292, 293; 356/4, 18

[56] References Cited

U.S. PATENT DOCUMENTS

| | | | |
|---|---|---|---|
| 2,282,285 | 5/1942 | Olson | 248/169 |
| 2,374,021 | 4/1945 | Korling | 248/170 X |
| 2,493,978 | 1/1950 | Kromer | 248/169 X |
| 2,588,399 | 3/1952 | McQuin | 248/188.5 X |
| 2,653,000 | 9/1953 | Cadwell et al. | 248/168 |
| 3,051,425 | 8/1962 | Homrighausen | 248/168 |
| 3,471,234 | 10/1969 | Studebaker | 356/3 |
| 3,588,249 | 6/1971 | Studebaker | 356/4 |
| 3,612,700 | 10/1971 | Nelson | 356/153 |
| 3,795,378 | 3/1974 | Clarke | 248/168 |
| 4,015,806 | 4/1977 | Cattermole | 248/168 |
| 4,199,123 | 4/1980 | Webber et al. | 248/168 |
| 4,317,552 | 3/1982 | Weidler | 248/168 |
| 4,324,477 | 4/1982 | Miyazaki | 248/171 X |
| 4,333,242 | 6/1982 | Genho | 33/227 |
| 4,519,705 | 5/1985 | Morrow | 356/138 |
| 4,648,697 | 3/1987 | Kawazoe | 354/293 |

OTHER PUBLICATIONS

AGL Catalog, "Laser Operated Machine Control".

*Primary Examiner*—Ramon O. Ramirez
*Attorney, Agent, or Firm*—Eugene D. Farley

[57] ABSTRACT

A giant tripod assembly for long-range laser beam generators used particularly for controlling from a remote station the operation of grading machines, scrapers, mining equipment or the like. The tripod may be as much as 12 or 15 feet high. It mounts the laser unit at its upper end where the generated beam lies above the plane of intervening vehicles and other obstructions and hence may be transmitted over a range of as much as 1500 ft or more. The control for adjusting the direction of transmission of the laser beam is mounted an appropriate distance downwardly of the laser beam generator to render it accessible to persons standing on the ground.

15 Claims, 2 Drawing Sheets

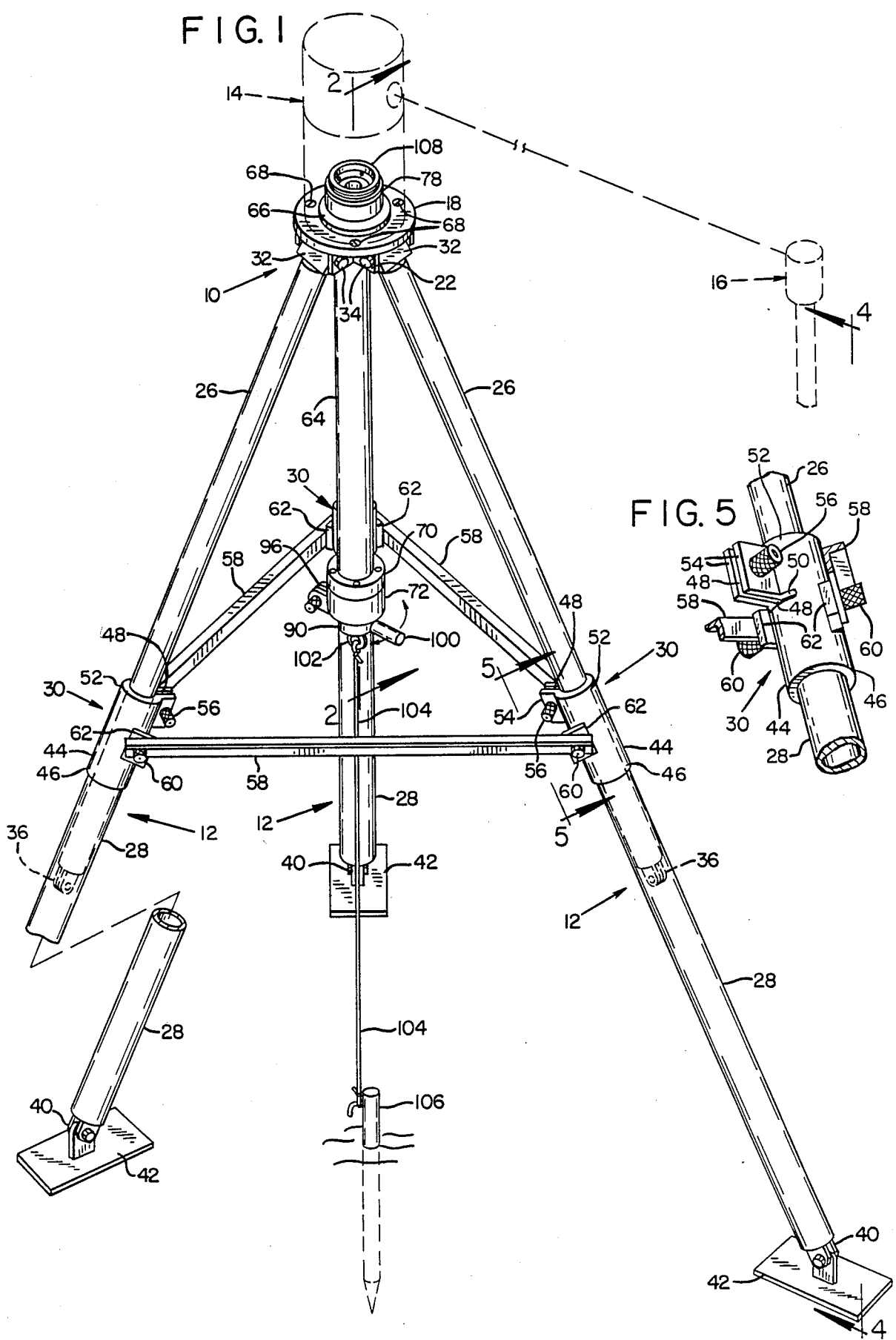

GIANT TRIPOD ASSEMBLY FOR SUPPORTING AND CONTROLLING LONG-RANGE LASER BEAM GENERATORS

BACKGROUND AND GENERAL STATEMENT OF THE INVENTION

This invention pertains to giant tripod assemblies for use in supporting and controlling the operation of long-range laser beam generators of the category employed for the remote control, at great distances, of various categories of equipment provided with laser beam receivers, such as earth moving equipment, grading machines, scrapers and mining equipment.

In the grading of airport runways, in land leveling agricultural irrigation operations, and in similar situations it is the currently widely used practice to direct the earth moving equipment from a remote station, i.e. a station which may be as much as a quarter mile away from the equipment. For this purpose the bulldozer or other earth moving equipment is equipped with a laser receiver functioning to adjust the elevation and angle of its blade to the desired settings. The receiver is actuated from the remote station by a directional laser beam which must be set at exactly the specified elevation and angle.

Since the control station necessarily is so far removed from the equipment it directs, intervening vehicles, structure, landscaping obstructions, terrain irregularities and the like may interrupt the laser beam and prevent it from performing its desired function.

It has been proposed to mount the laser beam generator on a giant support so that the beam is elevated above the plane of the obstructions. The problem of adjustment of the beam to the proper setting remains, however, since the generator is out of reach of the operator standing on the ground. Accordingly a great deal of time and effort must be expended to move the giant tripod bodily to adjust the setting of the beam emitted by the laser generator which it supports, and to stabilize the tripod accurately in its new location.

It is the general purpose of the present invention to provide a giant support tripod for long-range laser beam generators of the class and application described, which may be adjusted accurately and conveniently by a person standing on the ground beneath the generator.

It is another important object of the present invention to provide a support tripod for laser beam generators which, although of great height, is stabilized effectively against environmental disturbances such as those caused by wind, or by ground vibrations.

Still a further object of the present invention is the provision of a giant laser support tripod which is adjustable in height over a range of elevations, from modest to extreme, as required by particular applications.

Still another object of the invention is the provision of a collapsible, easily transported laser support tripod which, even though of great height, may be used to control the direction of the laser beam with extreme accuracy.

The foregoing and other objects of the present invention are achieved by the provision of a laser generator support tripod of gaint size and comprising broadly a hub plate having a central opening, a plurality of tripod legs, and attachment means for attaching the legs to the hub plate.

To enable angular control of the laser generator from a station below the hub plate, there is provided an elongated casing affixed to the latter. The casing extends downwardly through the hub plate opening to the control station below. Bearings mount an elongated shaft rotatably in the casing, with the lower shaft end on a plane which also is substantially at the plane of the control station.

Shaft actuator means is attached to the lower end of the shaft for rotating it to a predetermined angular position. Means for mounting the laser beam generator is affixed to the upper end of the shaft and is rotatable therewith. Accordingly, it is possible for the operator, standing far below the plane of the laser generator, to direct the generated laser beam accurately in the direction of the apparatus it is desired to control.

THE DRAWINGS

In the drawings:

FIG. 1 is a top perspective view of the herein described laser beam generator support tripod, with legs extended.

Figure 4:
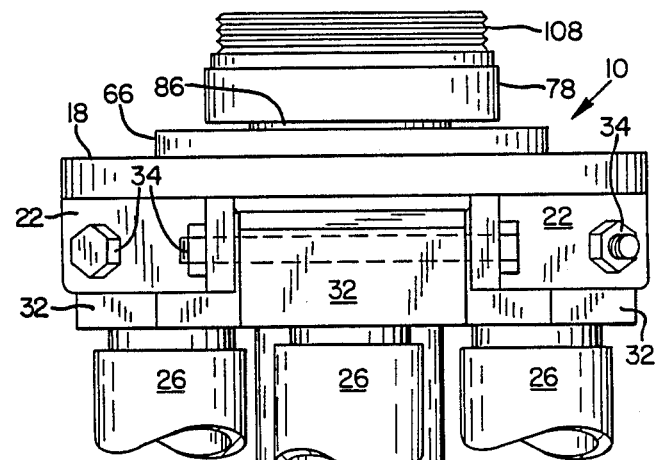

FIG. 4 is a foreshortened view in elevation, partly in section, looking in the direction of the arrows of line 4—4 of FIG. 1 and illustrating the construction of the tripod leg assembly, with legs in their folded position, and FIG. 5 is a fragmentary detailed view in perspective of a leg assembly combination clamping and coupling component, looking in the direction of the arrows of line 5—5 of FIG. 1.

DESCRIPTION OF A PREFERRED EMBODIMENT OF THE INVENTION

As indicated in FIG. 1, the herein described giant support tripod for long-range laser beam generators comprises, in general, a combination hub and control subassembly indicated generally at 10 and a plurality of leg subassemblies, 3 in the illustration, each being illustrated generally at 12.

The tripod is designed to support a laser generator indicated in dashed outline at 14. The generator, in turn, transmits a beam which is received by receiver 16 at a remote station, for example on a unit of earth moving equipment located from 1500 to 2000 ft away from the transmitter.

Figure 3:
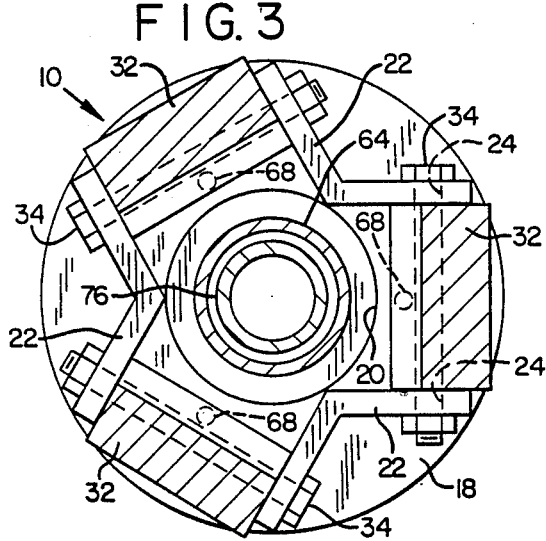
FIG. 3 is a transverse sectional view taken along line 3—3 of FIG. 2.
Figure 2:
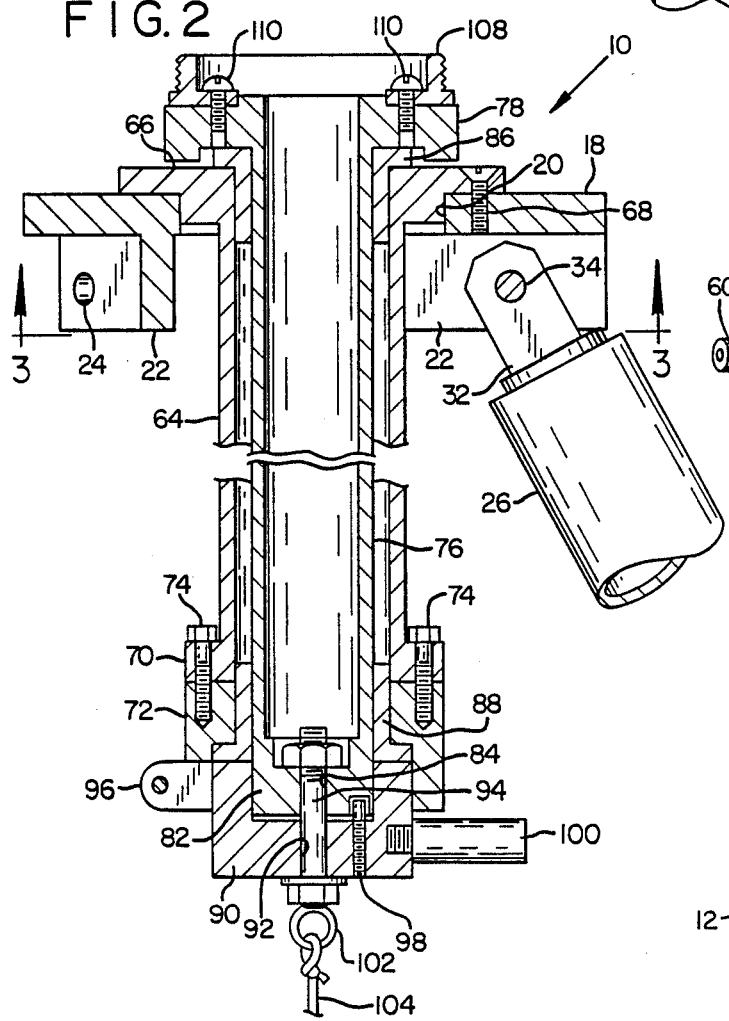
FIG. 2 is a foreshortened sectional view in elevation, taken along line 2—2 of FIG. 1, and illustrating the construction of the tripod hub assembly.

The construction of the combination tripod, hub and generator control subassembly is illustrated in FIGS. 2 and 3.

A hub plate 18 is of generally circular outline and provided with a central opening 20. Welded to its underside are a plurality of spaced, angular brackets 22, the planes of which are substantially normal to the plane of the underside of the hub plate. The brackets are designed for the hinged attachment of the tripod legs and for this purpose are provided with central perforations 24

Each tripod leg assembly has the construction illustrated in FIGS. 4 and 5.

Each assembly comprises an upper tubular segment 26, a lower tubular segment 28, and a combination coupling, clamp, and brace support component indicated generally at 30.

Upper leg segment 26 has at its upper end a head 32. This is one of the components of the hinge by means of which upper leg segment 26 is hinged between two of hub plate brackets 22. To this end, it is dimensioned to seat between adjacent ones of the brackets. It also is provided with a transverse perforation which aligns with perforation 24 of the adjacent brackets for the reception of a hinge bolt or pin 34.

The lower end of upper leg segment 26 is provided with a pair of spaced, perforated knuckles 36 which provide means for attachment of tripod feet in the event a tripod assembly of foreshortened elevation is desired, as will appear more fully hereinafter.

Lower leg segment 28 has a threaded upper end 38, FIG. 4. At its lower end it has a pair of spaced knuckles 40 which correspond to spaced knuckles 36 at the lower end of the upper leg segment in that they provide means for the hinged attachment of foot 42.

It thus is a feature of the invention that if a giant tripod is desired, i.e. a unit 12 or 15 feet high, lower leg segments 28 may be included in the tripod assembly with feet 42 attached to hinge knuckles 40 on lower leg segment 28. However, if a tripod of normal height is desired, lower leg segments 28 may be omitted altogether. In that case, feet 42 may be coupled directly to hinge knuckles 36 on the lower end of upper segment 26.

The two leg segments are releasably coupled together by means of combination coupling-clamp-and-brace support component 30.

As shown particularly in FIGS. 4 and 5, this component of the tripod assembly comprises a tubular body 44 the lower end 46 of which is threaded to receive the upper threaded end of lower leg segment 28.

To provide its clamping function, the upper end of tuge 44 has a longitudinal slot 48 communicating with a transverse slot 50. This provides a resilient, upper clamp section 52.

The latter section has radially extending flanges 54 which may be clamped together by means of bolt 56, with associated knurled nut.

As is apparent from FIG. 1, upper leg segment 26 telescopes through coupling 30 into lower leg section 28. It may be secured in any desired position of longitudinal extension by means of clamp section 52 operated by clamp bolt 56.

It is to be noted further that with upper leg segment 26 telescoping into lower leg segment 28, the latter may be made of enlarged heavy construction to provide a weighted base to the tripod, increasing correspondingly its stability in use.

Brace means are provided to lend further stability to the tripod unit.

As illustrated in FIG. 1, the brace means comprise a plurality of bars 58 arranged peripherally about the tripod, bridging the spaces between adjacent legs. The respective ends of the bars attach by means of bolts 60 to outwardly extending brackets or flanges 62 on clamp body 44.

The basic tripod thus described supports the mounting for the laser generating unit and the remote control therefor. These elements of the assembly are illustrated particularly in FIGS. 2 and 3.

A casing 64 of length sufficient to reach the operator stationed below the tripod hub is dimensioned to fit in opening 20 in hub plate 18.

The upper end of the casing is provided with a notched flang 66 which overlies the hub plate. It is secured to the latter by means of bolts 68.

The lower end of casing 64 has an annular flange 70. This overlies a casing skirt, or extension 72 and is attached thereto by means of bolts 74.

A shaft 76 is mounted rotatably within the casing. Its upper end has a notched, outwardly extending flange 78, which overlies casing flange 66.

The lower end of shaft 76 is provided with an inwardly extending closure 82 having an axial opening 84.

Bearing means are provided for rotatably mounting shaft 76 within casing 64.

To this end, upper thrust bearing 86 is inserted at the upper end of the assembly, between the casing and the shaft and the upper flanges thereof.

Lower thrust bearing 88 is inserted between the lower ends of the casing and shaft.

Actuation means is provided for securing the rotation of shaft 76 within the casing.

In the illustrated form of the invention, the actuation means comprises an actuator block or cap piece 90 mounted within skirt extension 72 of the casing and receiving shaft closure 82.

The actuator block has an axial perforation 92 which registers with perforation 84 through the lower end of the shaft. The registering perforations receive a bolt 94 which couples the two elements together. The casing is further secured to the shaft by means of a screw-operated locking clamp 96, as well as by means of set screw 98.

A lever 100 extends outwardly from actuator block 90. Angular movement of the lever rotates actuator block 90. This in turn rotates shaft 76 by means of set screw 98. The assembly is maintained in the selected position of adjustment by means of clamp 96.

As noted above, because of the great height of the tripod, it is essential to stabilize it against wind, ground vibrations, and other disturbing influences in order that the beam of laser generating unit 14 be directed accurately toward its target. This end is achieved in part by means of weighted lower leg segments 28 and leg braces 58. It is achieved further by the provision of means for staking the tripod to the ground.

As illustrated particularly in FIGS. 1 and 2, bolt 94 has an external eye 102. A flexible connecting member, such as a light cable nylon cord, or chain 104, connects the bolt eye to a stake 106. The latter may be driven into the ground centrally of the tripod, and tensioned to the desired degree.

Mounting means are provided for mounting the laser beam generator to the upper end of shaft 76 in such a manner that the generator rotates together with the shaft and shaft actuator.

As illustrated in FIGS. 1 and 2, the mounting means comprises a threaded mounting plate or adapter 108. This is secured to upper flange 78 of rotating shaft 76 by means of screws 110. It receives in a releasable mounting the threaded lower end of laser beam generator 14.

OPERATION

In operation, the tripod assembly is transported in collapsed condition to the site of its use. It is unfolded and, if a short tripod is all that is needed, feet 42 are connected directly to foot mountings 36 on the lower ends of upper leg segments 26. However, when a giant tripod is required, the lower ends of upper leg segments 26 are telescoped through couplings 30 into lower leg segments 28 and feet 42 coupled to the latter. Clamps 52 are employed to clamp together the upper and lower leg segments in the desired position of longitudinal extension.

Braces 58 are clamped in their operative position.

Stake 106 is driven into the ground beneath the tripod and connected to eye 102 by means of flexible connector 104. The assembly thus is stabilized against wind and earth vibration.

Laser beam generator 14 is set at the desired angle by operation of shaft 76 by means of the associated lever 100. It is locked in position by operation of clamp 96. Because of the great height of the unit, the beam may be transmitted great distances to receiver 16, without interference from intervening vehicles and minor topographical iregularities.

Having thus described in detail a preferred embodiment of the present invention, it will be apparent to those skilled in the art that various physical changes could be made in the device described herein without altering the inventive concepts and principles embodied. The present embodiment is therefore to be considered in all aspects as illustrative and not restrictive, the scope of the invention being indicated by the appended claims.

I claim:

1. A tripod assembly for supporting and controlling long-range laser beam generators comprising:
   (a) a hub plate having a central opening;
   (b) a plurality of tripod legs;
   (c) attachment means for attaching the legs to the hub plate;
   (d) an elongated casing fixed to the hub plate and extending downwardly through the hub plate opening;
   (e) an elongated shaft extending vertically through the casing;
   (f) bearing means mounting the shaft rotatably in the casing with the lower end of the shaft on a plane substantially below the plane of the hub plate;
   (g) shaft actuator means attached to the lower end of the shaft for securing the shaft against vertical displacement relative to the casing and for rotating the shaft to a predetermined angular position, and
   (h) laser beam generator mounting means affixed to the upper end of the shaft and rotatable therewith.

2. The tripod assembly of claim 1 wherein each leg comprises upper and lower telescoping segments and including tubular clamp means receiving the telescoped ends of the segments for clamping them releasably in selected positions of longitudinal adjustment.

3. The tripod assembly of claim 2 including threaded interengaging means for releasably interengaging one end of the tubular clamp means and the adjacent end of one of the leg segments, and a clamp on the other end of the tubular clamp means for frictionally engaging the adjacent end of the other of the leg segments.

4. The tripod assembly of claim 1 including peripherally arranged braces bridging the spaces between adjacent legs and securing means releasably securing the respective ends of the braces to the adjacent legs.

5. The tripod assembly of claim 2 including bar-type, peripherally arranged braces spanning the spaces between the legs, and threaded securing means releasably securing the resepctive ends of each brace to the adjacent clamp means components of the respective legs.

6. The tripod assembly of claim 2 including a plurality of tripod feet, and foot attaching means on the lower ends of both leg segments enabling selective attachment of the feet to the lower segments in a fully extended position of the tripod including both leg segments, or in the alternative to the upper segments in a shortened positon of the tripod including the upper leg segments only.

7. The tripod assembly of claim 1 including stake means adapted to be driven in the ground beneath the tripod, and connecting means interconnecting the tripod and the stake means for stabilizing the assembly in use against displacing forces.

8. The tripod assembly of claim 1 including stake means adapted to be driven in the ground beneath the tripod centrally thereof, and flexible connecting means interconnecting the lower end of the casing-shaft components of the tripod assembly for stabilizing the assembly and stake means against displacing forces.

9. The tripod assembly of claim 1 wherein the upper end of the casing is provided with a laterally extending peripheral flange overlying the hub plate and including screw means interengaging the flange and the hub plate;
   wherein the shaft is provided at its upper end with a laterally extending peripheral flange overlying the casing flange and including screw means fixing the laser beam generator mounting means to the shaft flange;
   wherein the shaft actuator means comprises a leveroperated actuator block, and
   wherein the bearing means comprise thrust bearings interposed between adjacent bearing surfaces of the casing and shaft flanges at the upper end of the assembly and between the adjacent casing and actuator block bearing surfaces at the lower end of the assembly.

10. A tripod assembly for supporting and controlling long-range laser beam generators comprising:
    (a) hub plate having a central opening;
    (b) a plurality of tripod legs, each leg comprising upper and lower telescoping segments and including tubular clamp means receiving the telescoped ends of the segments for clamping them releasably in selected positions of longitudinal adjustment;
    (c) attachment means for attaching the legs to the hub plate;
    (d) bar-type, peripherally arranged braces spanning the spaces between the legs, and threaded securing means releasably securing the respective ends of each brace to the adjacent clamp means components of the respective legs;
    (e) an elongated casing fixed to the hub plate and extending downwardly through the hub plate opening;
    (f) an elongated shaft extending vertically through the casing;
    (g) bearing means mounting the shaft rotatably in the casing with the lower end of the shaft on a plane substantially below the plane of the hub plate;
    (h) shaft actuator means attached to the lower end of the shaft for rotating it to a predetermined angular position; and
    (i) laser beam generator mounting means affixed to the upper end of the shaft and rotatable therewith.

11. A tripod assembly for supporting and controlling long-range laser beam generators comprising:
    (a) a hub plate having a central opening;
    (b) a plurality of tripod legs each leg comprising upper and lower telesocping segments and including tubular clamp means receiving the telescope ends of the segments for clamping them releasably in selected positions of longitudinal adjustment;

(c) attachment means for attaching the legs to the hub plate;

(d) a plurality of tripod feet, and foot attaching means on the lower ends of both leg segments enabling selective attachment of the feet to the lower segments in a fully extended position of the tripod including both leg segments, or in the alternative to the upper segments in a shortened position of the tripod including the upper leg segments only;

(e) an elongated casing fixed to the hub plate and extending vertically through the casing;

(f) an elongated shaft extending vertically through the casing;

(g) bearing means mounting the shaft rotatably in the casing with the lower end of the shaft on a plane substantially below the plane of the hub plate;

(h) shaft actuator means attached to the lower end of the shaft for rotating it to a predetermined angular position; and (i) laser beam generator mounting means affixed to the upper end of the shaft and rotatable therewith.

12. A tripod assembly for supporting and controlling long-range laser beams generators comprising:

(a) a hub plate having a central opening;

(b) a plurality of tripod legs;

(c) attachment means for attaching the legs to the hub plate;

(d) an elongated casing fixed to the hub plate and extending downwardly through the hub plate opening, the upper end of the casing being provided with a laterally extending peripheral flange overlying the hub plate and including screw means interengaging the flange and the hub plate;

(e) an elongated shaft extending vertically through the casing, the shaft being provided at its upper end with a laterally extending peripheral flange overlying the casing flange;

(f) bearing means mounting the shaft rotatably in the casing with the lower end of the shaft on a plane substantially below the plane of the hub plate;

(g) shaft actuator means comprising a lever-operated actuator block attached to the lower end of the shaft for rotating it to a predetermined angular position; and (h) laser beam generator mounting means affixed to the upper end of the shaft and rotatable therewith, and including screw means fixing the mounting means to the shaft flange;

(i) the bearing means comprising thrust bearings interposed between adjacent bearing surfaces of the casing and shaft flanges at the upper end of the assembly and between the adjacent casing and actuator block bearing surfaces at the lower end of the assembly.

13. A tripod assembly for supporting and controlling long-range laser beam generators comprising:

(a) a hub plate having a central opening;

(b) a plurality of tripod legs;

(c) attachment means for attaching the legs to the hub plate;

(d) peripherally arranged braces bridging the spaces between adjacent legs, and securing means releasably securing the respective ends of the braces to the adjacent legs;

(e) an elongated casing fixed to the hub plate and extending downwardly through the hub plate opening;

(f) an elongated shaft extending vertically through the casing;

(g) bearing means mounting the shaft rotatably in the casing with the lower end of the shaft on a plane substantially below the plane of the hub plate;

(h) shaft actuator means attached to the lower end of the shaft for rotating it to a predetermined angular position; and (i) laser beam generator mounting means affixed to the upper end of the shaft and rotatable therewith.

14. A tripod assembly for supporting and controlling long-range laser beam generators comprising:

(a) a hub plate having a central opening;

(b) a plurality of tripod legs;

(c) attachment means for attaching the legs to the hub plate;

(d) an elongated casing fixed to the hub plate and extending downwardly through the hub plate opening;

(e) an elongated shaft extending vertically through the casing;

(f) bearing means mounting the shaft rotatably in the casing with the lower end of the shaft on a plane substantially below the plane of the hub plate;

(g) shaft actuator means attached to the lower end of the shaft for rotating it to a predetermined angular position;

(h) laser beam generator mounting means affixed to the upper end of the shaft and rotatable therewith; and (i) stake means adapted to be driven in the ground beneath the tripod, and connecting means interconnecting the tripod and the stake means for stabilizing the assembly in use against displacing forces.

15. The tripod assembly of claim 14 wherein the stake means is adapted to be driven in the ground beneath the tripod centrally thereof, and the connecting means comprises flexible connecting means interconnecting the lower end of the casing-shaft components of the tripod assembly and stake means for stabilizing the assembly against displacing forces.

* * * * *